No. 873,508. PATENTED DEC. 10, 1907.
S. O. COWPER-COLES.
ELECTRODEPOSITION OF COPPER AND OTHER METALS.
APPLICATION FILED NOV. 12, 1906.
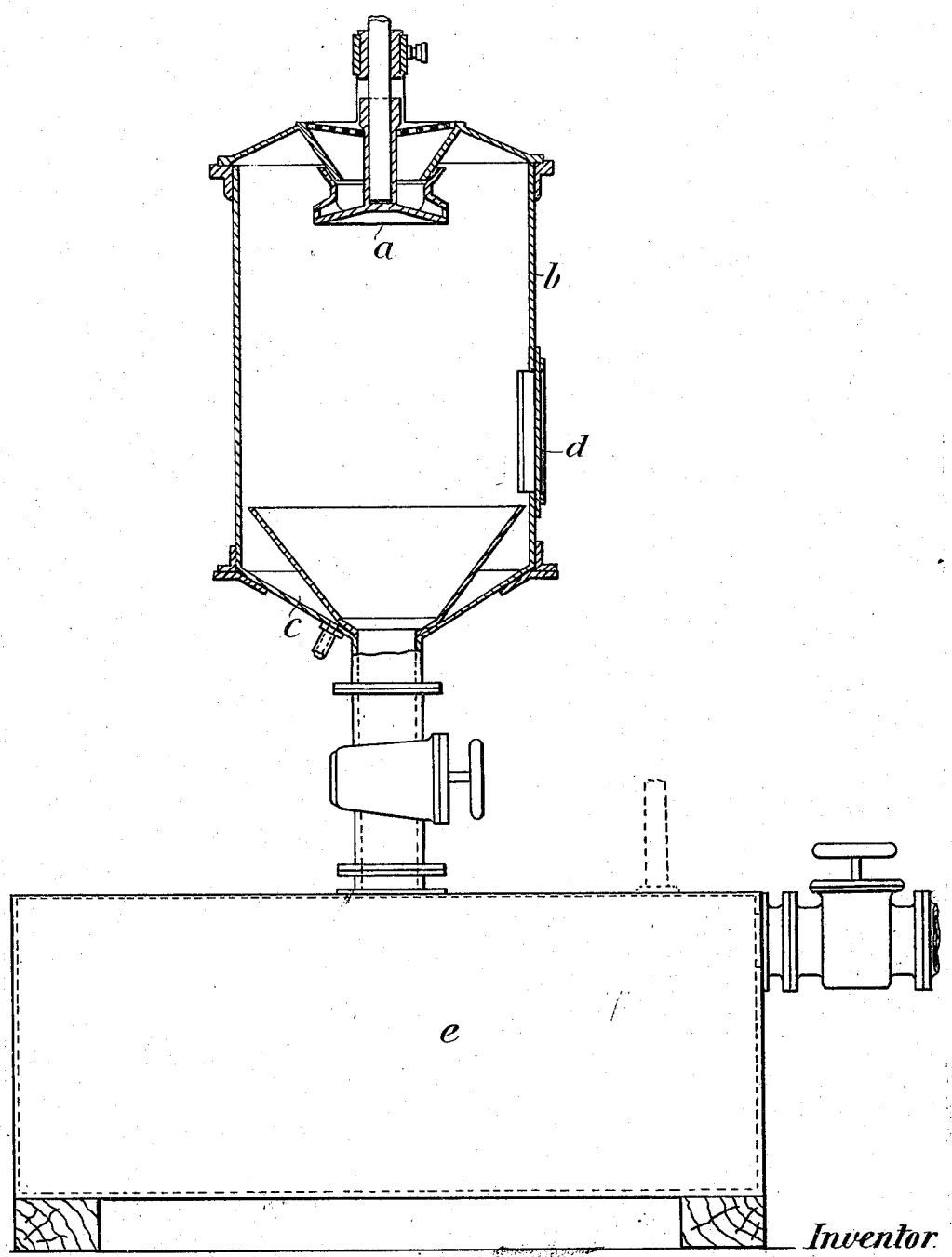
Witnesses.
Inventor.

UNITED STATES PATENT OFFICE.

SHERARD OSBORN COWPER-COLES, OF LONDON, ENGLAND.

ELECTRODEPOSITION OF COPPER AND OTHER METALS.

No. 873,508.  Specification of Letters Patent.  Patented Dec. 10, 1907.

Application filed November 12, 1906. Serial No. 343,100.

*To all whom it may concern:*

Be it known that I, SHERARD OSBORN COWPER-COLES, a subject of the King of Great Britain, residing at Grosvenor Mansions, 5 Victoria street, Westminster, London, England, have invented new and useful Improvements in Connection with the Electrodeposition of Copper and other Metals, of which the following is a specification.

My invention relates to improvements in the electro-deposition of copper or other metals from solutions which have to be maintained in an oxidized state, as for example, the deposition of copper from a cupric solution.

In carrying out the invention the solution from which the metal is to be deposited is brought continuously into intimate contact with air and in some cases also with strong light so as to maintain it in the oxidized state, the said solution being then freed from air, by any of the usual methods. To this end I advantageously convey the solution or electrolyte through an atomizer consisting of revolving wheels or vanes which throw the solution off them in the form of a fine spray against an outer casing so that the impurities held in suspension are projected against the walls of the casing and gravitate into an annular ring or sludge box. To free the solution from air it may then be passed through a tank or other vessel from which the air can be exhausted. The solution may be filtered if necessary either before or after the removal of the air.

The accompanying drawing represents in sectional elevation a suitable form of apparatus for carrying out the invention.

*a* is a revolving wheel forming the atomizer which is located in the outer casing *b* and into which the solution to be purified is supplied and thrown off peripherally in the form of a fine spray, being projected against the outer casing *b* in such a manner that the impurities held in suspension therein strike against the casing and gravitate into the annular sludge box *c*. The solution is then passed through the tank in which it is freed from air and from which the air can be exhausted as desired.

The casing *b* is provided with a window *d* through which sunlight or rays from an electric lamp pass so as to subject the solution as it drops down through the casing to the action of the light as hereinbefore described.

In applying the invention to the deposition of copper from a solution in which crude anodes are used and which consequently contains a considerable percentage of foreign matter in suspension, the solution, in addition to passing through the atomizer, is advantageously also passed through a large tank containing broken granite or feldspar of varying size; such an arrangement also allows the air contained in the solution after the process of aeration to be released. I find that strong light such as day light or the arc light has a considerable effect upon the solution which it clarifies; I therefore find it advantageous to subject the solution to strong sunlight or to the rays of an arc-light or lights before or after it passes through the atomizer or the separating tank, or during its passage therethrough.

Having now fully described and ascertained my said invention and the manner in which it is to be performed, I declare that what I claim is:—

1. In the electrodeposition of metals from solutions which have to be maintained in an oxidized state, the process of freeing the solution from impurities in suspension, which consists in passing the same through an atomizer and bringing it into intimate contact with air so as to convert and maintain it in an oxidized state, substantially as described.

2. In the electrodeposition of metals from solutions which have to be maintained in an oxidized state, the process wherein the solution is freed from impurities in suspension by centrifugal force and is brought into intimate contact with air so as to convert and maintain it in the oxidized state, substantially as hereinbefore described.

3. In the electrodeposition of metals from solutions which have to be maintained in an oxidized state, the process wherein the solution is freed from impurities in suspension by centrifugal force and is brought into intimate contact with air and strong light so as to convert and maintain it in the oxidized state, substantially as hereinbefore described.

4. In the electrodeposition of metals from solutions which have to be maintained in an oxidized state, the process of freeing the solution from impurities in suspension, which consists in passing the same through an atomizer and bringing it into intimate contact with air and in subsequently treating it to free it from air, substantially as described.

5. In the electrodeposition of copper from solutions the process wherein the solution is aerated and then conveyed through filtering material, the said solution being also submitted to the action of strong light, substantially as described.

SHERARD OSBORN COWPER-COLES.

Witnesses:
JOHN E. BOUSFIELD.
C. G. REDFERN.